March 13, 1962  E. B. SHERRON  3,025,097
LIFTING IMPLEMENT
Original Filed March 29, 1955
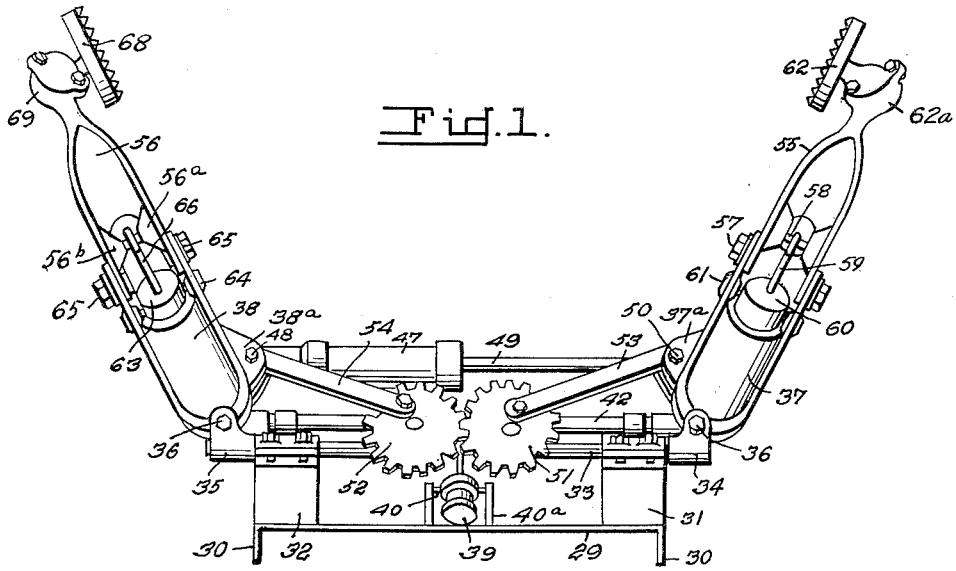
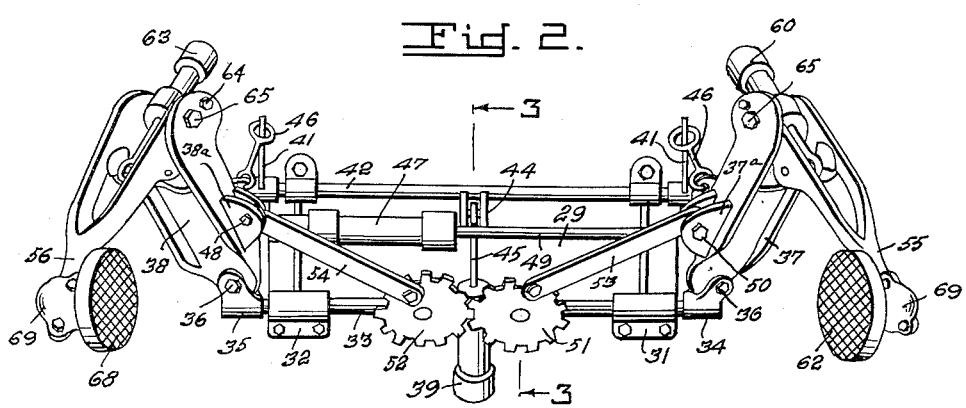
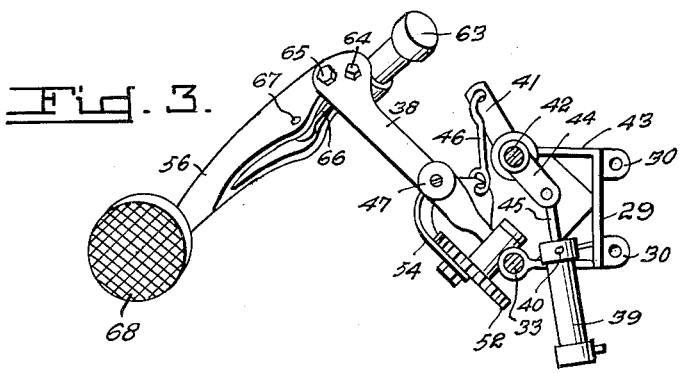
INVENTOR.
Emmitt B. Sherron
BY
Elizabeth Newton Dew
ATTORNEY

United States Patent Office 3,025,097
Patented Mar. 13, 1962

3,025,097
LIFTING IMPLEMENT
Emmitt B. Sherron, Greenville, S.C.
(Rte. 2, Simpsonville, S.C.)
Original application Mar. 29, 1955, Ser. No. 497,783, now Patent No. 2,843,165, dated July 15, 1958. Divided and this application May 13, 1958, Ser. No. 735,035
5 Claims. (Cl. 294—88)

In my prior application Serial Number 497,783, filed March 29, 1955, now Patent No. 2,843,165 dated July 15, 1958, and of which the present application is a division, I have disclosed a self-propelled logging machine by which tree trunks may be grasped, severed at or near ground lever, drawn into the machine, trimmed of their limbs, cut into sections of desired lengths and the sections discharged onto the ground or to a conveyor or truck, or transported to a mill.

One of the units disclosed as a component part of the machine of my aforesaid application is a unitary implement comprising a pair of cooperating arms mounted for universal pivotal movement and conjointly movable by hydraulic power means to grasp the tree trunk while it is being severed from the stump and to effect controlled movement thereof into the machine and while being severed of its limbs therein.

This unit, while of great utility as an integral part of the machine, is also of corresponding utility per se, in the handling, manipulation and transporting of heavy objects, particularly long poles, posts, pipe sections and other elongated objects and packages.

It is therefore the principal object of this invention to provide a pair of grasping and lifting arms so articulated with a mounting base and connected for conjoint motion, as to enable them to firmly grip objects therebetween and, while so gripped, to move or adjust them to a desired position or to convey them to a different location. The implement may be mounted upon a stationary base or upon a truck, tractor or like vehicle.

A further object is to provide an implement of the character stated, by which posts or poles may be grasped in a prone position, elevated or erected and placed in position, or by which cables, wires, fencing and like objects may be stretched or adjusted and held in position during emplacement.

Other objects, advantages and uses of the implement will become obvious to those skilled in the art after a study of the following description in connection with the accompanying drawing.

In this drawing:

FIGURE 1 is a bottom view showing the interconnected arms widely separated to disclose the means by which they are articulated with the base, mounted for universal pivotal movement and for conjoint motion toward and from each other.

FIGURE 2 is a front elevational view with the parts adjusted as in FIGURE 1, and FIGURE 3 is a section taken in a plane identified by line 3—3, FIGURE 2 and looking in the direction of the arrows.

Referring in detail to the drawing, a base or plate 29, generally rectangular in shape, is provided with outstanding lugs 30, FIGURES 1 and 3, adjacent its four corners, by which the plate may be attached to a truck, tractor or like vehicle. A pair of brackets 31 and 32 are fixed to platform 29 and carry aligned bearings journaling a shaft 33 between them. While this shaft is shown as horizontally disposed, it may be positioned upon its support at any angle up to 90° with respect to the horizontal as purposes and conditions of use dictate. As shown upon FIGURES 1 and 2, the ends of shaft 33 project a short distance beyond the bearings and have keyed thereon sleeves 34 and 35 each of which has a pair of laterally projecting spaced lugs pivotally mounting, as by pins 36, the respective bight portions of a pair of clevises or first sections 37 and 38 whereby the clevises are pivotable about parallel axes normal to shaft 33.

Referring more particularly to FIGURE 3, it will be noted that the cylinder 39 or a hydraulic motor has aligned trunnions 40 at one end by which the cylinder is pivoted in bearings 40a outstanding from base 29. A shaft 42 is journalled in brackets 43 fixed to and outstanding from base 29, on an axis parallel to and above shaft 33. Shaft 42 has a lever 44 fixed radially of its central portion and the end of the piston rod 45 of cylinder 39 is pivotally connected with the distal end of this lever. Near its ends, shaft 42 has a pair of levers fixed thereto in parallelism, each of which is connected by a respective link 46 with a corresponding one of the clevises 37 and 38. The construction is such that when pressure fluid is admitted to cylinder 39 by valve mechanism not shown but fully disclosed in my copending application previously identified, the resulting movement of rod 45 effects a corresponding pivotal movement in unison, of clevises 37, 38 and shaft 33, about the axis of the shaft and for all angular positions of the clevises about their pivot pins 36.

As clearly shown upon FIGURES 1 and 2, the clevises 37 and 38 have lugs 37a and 38a fixed to and outstanding from their confronting sides and offset from their pivot axes. A hydraulic power cylinder 47 has its base pivoted at 48 to lug 38a while the piston rod 49 of the cylinder has its end pivoted at 50 to lug 37a. Pivots 36, 48 and 50 are all parallel and perpendicular to shaft 33 so that introduction of perssure fluid to cylinder 47 on one or the other side of the piston therein, causes a corresponding pivotal movement of the clesives in opposite directions about their pivot pins 36. The pivotal movement of the clevises is maintained equal at all times by any suitable mechanism, which may comprise a pair of intermeshing gears or gear segments 51 and 52 centrally pivoted at spaced positions on and along shaft 33 and having pitmans 53 and 54, respectively, pivoted to them in positions radially offset from their centers. The other ends of the pitmans are pivoted to the lugs 37a and 38a, by the pivots 48 and 50 previously described. Thus, in a manner obvious from inspection of the drawing, the clevises are constrained to equal and opposite pivotal movement in response to introduction of fluid under pressure to cylinder 47.

Duplicate arms or second sections 55 and 56 are pivoted to the distal ends of clevises 37 and 38, respectively, whereby the arms are pivotable about axes which are perpendicular to the axes of the corresponding pivots 36. Referring to FIGURE 2, it will be noted that arm 56, for example, is bifurcated at its pivoted end to form axially spaced lugs which fit between the arms of clevis 38 and are pivoted thereto by aligned pivot pins or bolts 65.

As best shown upon FIGURES 1 and 2, the bifurcations of arm 56 have widened portions intermediate their ends, which are pressed inwardly to form cooperating supports 56a and 56b for a wrist pin 67 having a smooth fit with the bearing in the free end of a piston rod 66, connected with a piston, not shown, within power cylinder 63. As clearly shown upon FIGURE 2, one end of this cylinder is pivotally mounted at 64 by and between the arms of clevis 38. The construction is such that the axis of pivot pins 65 is offset from the line of thrust of power cylinder 63 throughout the range of pivotal movement of arm 56 so that the introduction of pressure fluid to one or the other end of cylinder 63, effects a corresponding angular or pivotal movement of arm 56 about the axis of pins 65, that is, relatively to clevis 38, to thereby increase or decrease, as the case may be, the effective length of the combined clevis and arm relatively to pivot 36. At its free or distal end, arm 56 carries a clamping disk 68 by means of a ball and socket joint 69. The friction of the joint is just sufficient to prevent free movement of the disk 68 so that, in response to clamping force, it adjusts itself to the gripped surface of objects it engages. Since the arm 55 pivoted upon the other clevis 37, and the parts for effecting its movement are in all respects similar to those just described for arm 56, it is sufficient, referring to FIGURE 1, to identify hydraulic power cylinder 60, pivoted at 61 to clevis 37, pivot pins 57 connecting the clevis and arm, connecting rod 59 pivoted at 58 to arm 55, clamping disk 62 and ball and socket joint 62a mounting it upon the arm.

By the construction just described, clamping disks 62 and 68 are mounted for universal pivotal movement about three mutually normal axes, the first of which is the axis of shaft 33, the second, the axis of pins 36 normal to the first axis, and the third, the axis of pivots 57 and 65 each of which is at all times normal to its respective axis 36. Thus the position of disks 62 and 68 about the axis of shaft 33 may be controlled by admission of pressure fluid to one side or the other of the piston in cylinder 39, their separation is controlled by power cylinder 47 and their effective distance radially of shaft 33 is controlled by cylinders 60 and 63. As fully explained and disclosed in my prior application previously identified, each of the cylinders 39, 47, 60 and 63, has fluid pressure connections to its respective ends which are connected with a source of fluid under pressure, through manually-controlled valve means. An individual valve is provided for each of cylinders 39 and 47, while a single valve is provided for the two power cylinders 60 and 63 whereby the pistons therein are moved in unison in the same direction and to the same extent so that the two clamping disks 62 and 68 are at all times in opposed cooperative relation. The aforesaid valves, which may be solenoid controlled, each include a single element which, when moved in a first direction, effects the introduction of pressure fluid to one end of its cylinder to drive the piston therein in one direction and simultaneously to exhaust fluid from the other end of the cylinder and, when moved in a second or opposite direction, effects the introduction of pressure fluid to the other end of the cylinder and the exhaustion of fluid from the first end, to thereby move the piston in the opposite direction. Since such controls for a fluid pressure system are fully disclosed in my prior application aforesaid, they are not shown herein.

I have thus disclosed an implement of great utility for grasping, handling, adjusting, moving and emplacing heavy objects such as poles, posts and pipe sections and which may be mounted on various types of stationary or mobile bases to adapt it for a wide range of uses. With the arms and clamping disks separated a suitable distance, fluid is admitted to cylinders 39, 60 and 63, sequentially or simultaneously, to position the disks opposite the portion of the object to be grasped. Fluid is then admitted to cylinder 47 to firmly grip the object. Thereafter, while cylinder 47 continues to exert its gripping force, fluid pressure is again introduced to cylinder 39 and/or cylinders 60 and 63, to lift the object for movement to a desired position or location. If desired, base 29 may be mounted for rotation about an axis normal to it so that the entire implement may be rotated about this axis to add a further degree of mobility.

While I have described a preferred embodiment of my invention as presently known to me, various modifications and substitutions of equivalents will occur to those skilled in the art after a study of the foregoing disclosure. Consequently the disclosure is to be taken in an illustrative rather than a limiting sense; and it is my desire and intention to reserve all modifications within the scope of the subjoined claims.

Having now fully disclosed the invention, what I claim and desire to secure by Letters Patent is:

1. A lifting implement comprising a base, a pair of gripping arms, first means mounting said arms on said base for movement in unison about a first axis fixed with said base and for pivotal movement about two respective spaced parallel second axes normal to said first axis, first power means connected between said base and said first means and energizable to move said arms as a unit about said first axis, second power means connected with said arms and energizable to equally and oppositely pivot the same about said second axes, each said arm comprising a first section pivoted on a respective one of said second axes, and a second section pivoted on the distal end of said first section for angular movement relative to said first section, about a third axis normal to the corresponding one of said second axes, and third and fourth power means each carried by a respective one of said arms and energizable to move said second sections in unison about said third axes.

2. In a lifting implement, a base, a shaft, bearings mounting said shaft on said base for pivotal movement about a first axis fixed with said base, a pair of arms each comprising first and second sections, means pivoting each said first section to a respective end of said shaft for pivotal movement about respective parallel second axes normal to said first axis, means connecting said first sections for equal and opposite movement about said second axes, means connecting said first and second sections of the respective arms at their contiguous ends for relative pivotal movement about a third axis normal to the corresponding one of said second axes, clamping means at the distal end of each said second section, first power means connected between said base and shaft and energizable to selectively effect pivotal movement of said shaft and arms about said first axis, second power means connected between said first sections and energizable to move said arms equally and oppositely about said second axes, and means carried by each said arm and controllable to effect pivotal movement of said second sections about a corresponding third axis.

3. In a lifting and manipulating implement, a base, a shaft, means journaling said shaft on said base for rotation about a first axis fixed with said base, a pair of clevises journaled by their bight portions to respective ends of said shaft for pivotal movement about parallel second axes normal to said shaft, a pair of arm sections each journaled upon the open end of a respective clevis for angular movement about respective third axes perpendicular to said second axes, a pair of clamping disks each swiveled to the distal end of a respective arm section, and manually controllable power means connecting said clevises to equally and oppositely pivot the same about said second axes.

4. An implement for manipulating heavy elongated objects comprising, a base, a pair of arms each comprising first and second sections, means journaling said first arm sections on said base for conjoint rotation in spaced relation about a common first axis fixed with said base and for pivotal movement about respective parallel second axes normal to said first axis, means interpivoting the first and second sections of each arm for movement about respective third axes normal to said second axes, clamping means carried in cooperative positions at the distal end of each said second section, means connecting said first sections for simultaneous equal and opposite movement about said second axes, first power means connected with said first sections to equally pivot said arms about said first axis, second power means connecting said first arm sections to pivot the same about said second axes, and power means carried by each said arm and connecting the sections thereof to relatively pivot the same about said third axes.

5. In a lifting implement, a pair of arms, each comprising first and second sections connected at their meeting ends for pivotal movement about hinge axes, power means connecting the respective sections of each said arm and operable to relatively pivot the same, a support, a shaft journaled in said support for rotation on an axis fixed therewith, pivot means mounting the said first section of each said arm on said shaft for angular movement about respective spaced parallel axes normal to said shaft axis, said hinge axes being angularly related to said spaced parallel axes, means including power means carried by connecting and angularly moving said arms equally and oppositely about the axes of said pivot means, and power means connected between said base and shaft and operable to pivot said arms as a unit.

References Cited in the file of this patent
UNITED STATES PATENTS

| | | |
|---|---|---|
| 1,899,750 | Dorman | Feb. 28, 1933 |
| 2,622,915 | Horn | Dec. 23, 1952 |
| 2,663,952 | Winget | Dec. 29, 1953 |
| 2,821,317 | Locke | Jan. 28, 1958 |